United States Patent
Li et al.

(10) Patent No.: US 11,729,738 B2
(45) Date of Patent: Aug. 15, 2023

(54) NETWORK NODE, USER EQUIPMENT AND METHODS IN A WIRELESS COMMUNICATIONS NETWORK

(71) Applicant: Telefonaktiebolaget LM Ericsson (PUBL), Stockholm (SE)

(72) Inventors: Xiaoming Li, Shanghai (CN); Yixin Chen, Shanghai (CN); Zhiwei Qu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 149 days.

(21) Appl. No.: 17/420,598

(22) PCT Filed: Jan. 18, 2019

(86) PCT No.: PCT/CN2019/072346
§ 371 (c)(1),
(2) Date: Jul. 2, 2021

(87) PCT Pub. No.: WO2020/147112
PCT Pub. Date: Jul. 23, 2020

(65) Prior Publication Data
US 2022/0086792 A1  Mar. 17, 2022

(51) Int. Cl.
*H04W 4/00* (2018.01)
*H04W 64/00* (2009.01)
(Continued)

(52) U.S. Cl.
CPC ............ *H04W 64/00* (2013.01); *H04W 8/06* (2013.01); *H04W 72/20* (2023.01); *H04W 4/14* (2013.01)

(58) Field of Classification Search
CPC ....... H04W 64/00; H04W 8/06; H04W 72/20; H04W 4/14; H04W 8/30; H04W 76/19; H04W 84/042; H04W 60/04
See application file for complete search history.

(56) References Cited

U.S. PATENT DOCUMENTS

2011/0269482 A1  11/2011  Henttonen et al.
2012/0184262 A1  7/2012  Olsson et al.
(Continued)

FOREIGN PATENT DOCUMENTS

CN           108924771 A        11/2018
WO     WO-2014117390 A1  *  8/2014   ............. H04L 12/64

OTHER PUBLICATIONS

Extended European Search Report issued for Application No./ Patent No. 19910812.7-1213 / 3912405 PCT/CN2019072346— dated Jul. 21, 2022.
(Continued)

*Primary Examiner* — Omoniyi Obayanju
(74) *Attorney, Agent, or Firm* — Baker Botts L.L.P.

(57) ABSTRACT

A method performed by a network node for restoring a Short Message Service (SMS) service in a connection between User Equipment (UE) and a communications network is provided. The UE is attached to the communications network with Evolved Packet System (EPS) attach and SMS only, via a radio network node, a Visitor Location Register (VLR) Mobile Switching Centre (MSC), and the network node. When receiving information that indicates a restart of the VLR MSC in the connection, network node sends (202) to the radio network node, an indication to trigger the UE to send a Tracking Area Update (TAU) request with SMS only. The network node receives (203) the TAU request with SMS only, triggered by the UE according to the indication sent to the radio network node. The network node then restores (204) the SMS service based on information in the TAU request with SMS only, received from the UE.

16 Claims, 10 Drawing Sheets

Method in network node 130

(51) Int. Cl.
*H04W 8/06* (2009.01)
*H04W 72/20* (2023.01)
*H04W 4/14* (2009.01)

(56) References Cited

U.S. PATENT DOCUMENTS

| | | | |
|---|---|---|---|
| 2014/0106742 | A1 | 8/2014 | Landais |
| 2014/0235240 | A1 | 8/2014 | Chen et al. |
| 2014/0235285 | A1 | 8/2014 | Stojanovski |
| 2015/0011250 | A1* | 1/2015 | Xu .................. H04L 51/58 455/466 |
| 2015/0023252 | A1 | 1/2015 | Alla et al. |
| 2016/0269942 | A1 | 9/2016 | Olsson et al. |
| 2016/0345158 | A1 | 11/2016 | Karlqvist et al. |

OTHER PUBLICATIONS

PCT International Search Report issued for International application No. PCT/CN2019/072346—dated Sep. 30, 2019.
PCT Written Opinion of the International Searching Authority issued for International application No. PCT/CN2019/072346—dated Sep. 30, 2019.
3GPP TS 23.007 v15.1.0; Technical Specification; 3rd Generation Partnership Project; Technical Specification Group Core Network and Terminals; Restoration procedures (Release 15)—Sep. 2018.
3GPP TS 23.401 v15.4.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15)—Jun. 2018.
3GPP TS 24.301 v15.3.0; Technical Specification; 3rd Generation Partnership Project; Technical Specification Group Core Network and Terminals; Non-Access-Stratum (NAS) protocol for Evolved Packet System (EPS); Stage 3 (Release 15)—Jun. 2018.
3GPP TS 29.118 v15.2.0; Technical Specification; 3rd Generation Partnership Project; Technical Specification Group Core Network and Terminals; Mobility Management Entity (MME)—Visitor Location Register (VLR) SGs interface specification (Release 15)—Mar. 2018.
3GPP TS 36.413 v15.2.0; Technical Specification; 3rd Generation Partnership Project; Technical Specification Group Radio Access Network; Evolved Universal Terrestrial Radio Access Network (E-UTRAN); S1 Application Protocol (S1AP) (Release 15)—Jun. 2018.
3GPP TSG-CT WG1 Meeting #105; Krakow (Poland), Aug. 21-25, 2017; Source: Samsung, Interdigital Communications, Huawei, HiSilicon; Title: Change of need for SMS including deregistering for SMS (UE to AMF); Agenda Item: 15.2.1.7 (C1-173022).
Official Communication issued for Chinese Patent Application No. 201980089402.4—dated May 7, 2023.
Search Report issued for Chinese Patent Application No. 2019800894024—dated May 5, 2023.

* cited by examiner

Fig. 2 Method in network node 130

Fig. 3  Method in UE 120

NETWORK NODE, USER EQUIPMENT AND METHODS IN A WIRELESS COMMUNICATIONS NETWORK

PRIORITY

This nonprovisional application is a U.S. National Stage Filing under 35 U.S.C. § 371 of International Patent Application Serial No. PCT/CN2019/072346 filed Jan. 18, 2019 and entitled "NETWORK NODE, USER EQUIPMENT AND METHODS IN A WIRELESS COMMUNICATIONS NETWORK" which is hereby incorporated by reference in its entirety.

TECHNICAL FIELD

Embodiments herein relate to a network node, a User Equipment (UE) and methods therein. In some aspects, they relate to restoring a Short Message Service (SMS) service in a connection between the UE and a communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Attach. A UE needs to register in the network to access services. This registration is described as Network Attachment, which is referred to as attach.

Detach. The Detach procedure allows:

The UE to inform the network that it does not access the network any longer, or

The network to inform the UE that the access to the network is closed by the network side.

A UE may attach to both EPS services and non-EPS services.

EPS services means services provided by Packet Switched (PS) domain.

Non-EPS services means services provided by Circuit Switched (CS) domain. Such services are for example CS voice and SMS. In general, attach to non-EPS services may be needed so that these services can be provided to a UE that is operating in LTE network, e.g. incoming/Mobile-terminated CS voice call or SMS.

An attach type indicates the purpose of an attach. There are different types of attach that may be determined. The attach type is determined by a kind of mutual agreement between a UE and the network. It means that UE indicates to the network, the attach type it want to get and the network determines based on this an attach type that is available, and informs it to UE in a following procedure:

For EPS attach, indicate an attach for EPS services only. This is also referred to as EPS only.

For Combined EPS/IMSI attach indicate an attach for both EPS and non-EPS services. IMSI is the abbreviation for International Mobile Subscriber Identity.

A Packet Data Network (PDN) connectivity procedure is used by a UE to request a setup of a default EPS bearer to a PDN e.g. for EPS services.

A UE attached for EPS services may operate in one of the following operation modes:

PS mode of operation, wherein the UE registers only to EPS services, CS/PS mode 1 of operation, voice centric, wherein the UE is CS fallback capable and configured to use CS fallback, and non-EPS services are preferred. The UE registers to both EPS and non-EPS services. A further mode is CS/PS mode 2 of operation data centric, wherein the UE is CS fallback capable and configured to use CS fallback, and EPS services are preferred. The UE registers to both EPS and non-EPS services.

An SMS with combined attach means an EPS/IMSI attach. This is a combined attach procedure, wherein an EPS attach is combined with an IMSI attach. This SMS with combined attach, may be used by a UE in CS/PS mode 1 or CS/PS mode 2 of operation to attach for both EPS services and SMS only.

This combined attach procedure may also used by a UE in CS/PS mode 1 or CS/PS mode 2 of operation to attach for EPS services if it is already IMSI attached for non-EPS services.

When a UE initiates a combined attach procedure, the UE shall indicate "combined EPS/IMSI attach" in the EPS attach type Information Element (IE) sent to the network. This is to inform the network of witch attach type the UE want to get.

Therefore, a UE who is capable to make SMS with combined attach, should also support IMSI detach procedure, which e.g. means Detach with type "IMSI Detach". Detach when used herein means that the UE will not have non-EPS services. Detach procedure when used herein means a detach procedure with a detach type that indicates that it is for non-EPS services.

More and more N B-IoT devices are deployed in live network for Machine to Machine (M2M) services. M2M refers to direct communication between devices using any communications channel, including wired and wireless. M2M communication may e.g. include industrial instrumentation, enabling a sensor or meter to communicate the data it records such as e.g. temperature, inventory level, etc. to application software that can use it, e.g. for adjusting an industrial process based on temperature or placing orders to replenish inventory.

Based on 3GPP, N B-IoT devices support SMS without combined attach and attach without PDN connectivity.

SMS without combined attach, means that a UE does EPS attach instead of combined attach, to a communications network for EPS services and "SMS only", if the UE supports NB-S1 mode only. Here it is realised that such kind of NB-IoT devices, who doesn't support IMSI detach, comparing with UEs who can do combined attach. This means that there is no way for an MME to trigger an IMSI detach procedure to such NB-S1 mode devices, to indicate that it will no longer have non-EPS services, e.g. SMS any more.

Attach without PDN connectivity, means that If this is supported, the UE does not need to establish a PDN connection as part of the Attach procedure. The UE and MME may at any time release all the PDN connections and remain EPS attached. Thus, a UE can be registered in an LTE network without any default PDN connection.

It means that an N B-IoT device can register to the network, even without any PDN connection, but only having SMS service over a reference point between the MME and MSC server. This reference point is referred to as SGs reference point. This means that sometimes SMS may be used to trigger PDN a connection setup. All in all, SMS service is important for NB-IoT devices.

The SGs reference point is used for mobility management and paging procedures between the EPS and a CS domain, and is based on the Gs interface procedures. The SGs reference point is also used for the delivery of both mobile originating SMS and mobile terminating SMS. Additional procedures for alignment with the Gs reference point are not precluded.

The Gs interface is the interface between the Mobile Switching Center (MSC)/Visitor Location Register (VLR) and the Serving GPRS Support Node (SGSN), where GPRS is the abbreviation for General Packet Radio Services. An association may be set up between the MSC/VLR and SGSN databases. The association is set up for further communication between SGSN and MSC, which means for a specified UE, the SGSN will communicate with the MSC via the corresponding association with the MSC. MSC/VLR when used herein means MSC and/or VLR. Through the Gs interface, location information of UEs that are attached to the GPRS and non-GPRS services can be coordinated between the SGSN and the MSC/VLR. In addition, the Gs interface may be used to complete some CS procedures through the SGSN.

Thus, the SGs is the interface that connects MME and MSC server and/or VLR. This interface connects databases between the MME and the VLR. The SGs interface is different from other interfaces in that there exists an SGs association between VLR and MME per UE.

A VLR failure is an abnormal situation in VLR, e.g. VLR restart which may be caused by for example software error in VLR which leads to a VLR restart.

Currently once a VLR failure happens the VLR will inform the MME about this, e.g. in a message comprising an indication to reset the SGs AP, sent from the VLR to the MME, such as e.g. a SGsAP-RESET-INDICATION message, wherein the SGsAP when used herein means SGs Application Part (AP) in 3GPP TS29.118.

The MME will then set the "VLR-Reliable" Mobility Management (MM) context variable to "false" in order to mark that remote VLR restarts, so the SGs association with the VLR for the impacted UE should be re-established. The IMSI detach procedures for deleting the SGs association would be applied. An IMSI is used to identify a UE of a cellular network and is a unique identification associated with all cellular networks. It may be stored as a 64 bit field and is sent by the UE to the network. The IMSI detach procedure is to detach the UE for non-EPS services only.

Tracking Area Update (TAU). An LTE network, e.g. the MME, has to have updated location information about UEs in idle state to find out in which Tracking Area (TA) a particular UE is located. For this, the UE notifies the MME of its current location by sending a TAU message, e.g. a TAU Request message every time it moves between TAs.

Within a combined tracking area updating procedure messages such as TRACKING AREA UPDATE ACCEPT and TRACKING AREA UPDATE COMPLETE carry information for both the tracking area updating and the location area updating.

Periodic tracking area updating is used by the UE to periodically notify the network about the availability of the UE to the network. A periodic Tracking Area Update (pTAU) procedure may be performed by a UE upon expiration of the TAU timer. A UE in Idle state reports its current location to the MME by sending a TAU Request message when the TAU timer expires.

Meanwhile the IMSI detach procedure is going on, the MME may according to 3GPP TS29.118 chapter 5.7.3:
- If a combined tracking area update request is received, immediately perform the location update for non-EPS services procedure towards the VLR; or
- if a periodic tracking area update request is received, dependent on network configuration and operator policy,
  - perform a network initiated detach with detach, type "IMSI detach" immediately after the completion of the periodic TAU procedure; or
  - immediately perform a location update for non-EPS services procedure towards the VLR.

SUMMARY

As a part of developing embodiments herein a problem will first be identified and discussed.

For UEs being NB-IoT devices, registration into the communications network via EPS attach with SMS only indication, IMSI detach is not supported for these devices since the combined attach would not happen during the attach/TAU procedure. An attach/TAU procedure when used herein means the procedure of registering the UE into EPS network. Then once there is any VLR failure in network, the MME is unable to delete SGs association via IMSI detach unless the MME initiates the EPS detach to the UE, which will interrupt other ongoing PS services if any and it is quite battery consuming. SGs association means a logical connection between the MME and the MSCVLR for a specific UE.

Moreover, most N B-IoT devices may be stationary and provided with a very long periodic TAU timer, so SGs association re-establishment only upon TAU or pTAU as in the current solution means a big impact since all Mobile Terminating (MT) SMS cannot be sent to the UE, unless SGs association is re-established once TAU or pTAU is received from UE.

The MME thus always has to wait for a UE initiated TAU procedure, which may need quite longtime delay.

An object of embodiments herein is to improve the performance of a communications network using SMS service in connections between UEs and a communications network.

According to an aspect of embodiments herein, the object is achieved by method performed by a network node for restoring a Short Message Service, SMS, service in a connection between a User Equipment, UE, and a communications network. The UE is attached to the communications network with Evolved Packet System, EPS, attach and SMS only, via a radio network node a Visitor Location Register, VLR, Mobile Switching Centre, MSC, and the network node. When receiving information that indicates a restart of the VLR MSC in the connection, network node sends to the radio network node, an indication to trigger the UE to send a Tracking Area Update, TAU, request with SMS only. The network node receives the TAU request with SMS only, triggered by the UE according to the indication sent to the radio network node. The network node then restores the SMS service based on information in the TAU request with SMS only, received from the UE.

According to a another aspect of embodiments herein, the object is achieved by a method performed by a User Equipment, UE, for assisting a network node in restoring a Short Message Service, SMS, service in a connection between the UE and a communications network. The UE is attached to the communications network with Evolved Packet System, EPS, attach and SMS only, via a radio network node, a Visitor Location Register, VLR, Mobile Switching Centre, MSC, and a network node. When a restart of the VLR MSC in the connection is required, The UE receives an indication from the radio network node. The indication indicates to the UE, to send a Tracking Area Update, TAU, request with SMS only. The UE then assists the network node 130 by sending to the network node, a TAU request with SMS only according to the received indication. This enables the network node to restore the SMS service based on information in the TAU request with SMS only.

According to an aspect of embodiments herein, the object is achieved by a network node configured to restore a Short Message Service, SMS, service in a connection between a User Equipment, UE, and a communications network. The UE is adapted to be attached to the communications network with Evolved Packet System, EPS, attach and SMS only, via a radio network node, a Visitor Location Register, VLR, Mobile Switching Centre, MSC, and the network node. The network node is configured to:

When receiving information indicating a restart of the VLR MSC in the connection, send to the radio network node, an indication to trigger the UE to send a Tracking Area Update, TAU, request with SMS only, receive the TAU request with SMS only, adapted to be triggered by the UE according to the indication sent to the radio network node, and restore the SMS service based on information in the TAU request with SMS only, adapted to be received from the UE.

According to a another aspect of embodiments herein, the object is achieved by a User Equipment, UE, configured to assist a network node in restoring a Short Message Service, SMS, service in a connection between the UE and a communications network. The UE is adapted to be attached to the communications network with Evolved Packet System, EPS, attach and SMS only, via a radio network node, a Visitor Location Register, VLR, Mobile Switching Centre, MSC, and a network node. The UE is configured to:

When a restart of the VLR MSC in the connection is required, receive from the radio network node, an indication to the UE, to send a Tracking Area Update, TAU, request with SMS only, and assist the network node by sending to the network node a TAU request with SMS only according to the received indication, enabling the network node to restore the SMS service based on information in the TAU request with SMS only.

Since the TAU procedure is initiated by the network node by sending an indication to the UE, to send a TAU request with SMS only, the network node do not need to wait for a UE initiated TAU procedure, which may need quite longtime delay, and the restoration of the SMS service can be performed much faster. This results in an improved performance of a communications network using SMS service in connections between UEs and a communications network.

BRIEF DESCRIPTION OF THE DRAWINGS

Examples of embodiments herein are described in more detail with reference to attached drawings in which.

DETAILED DESCRIPTION

Embodiments provide SMS service restoration for UEs such as NB-IoT devices upon a restart of a VLR MSC, by providing a network triggered TAU procedure so that the network node does not need to wait for a UE initiated TAU procedure which causes unwanted delay. Some example embodiments herein introduce new cause code in a UE Context Release Command to trigger the UE to perform TAU with SMS only.

According to an example, a network node such as an MME may connect the UE, e.g. page UE if the UE is in idle state such as EPS Connection Management (ECM)_Idle state (ECM_IDLE). The network node will then release an S1 connection between a base station and the EPC by using a new cause code in an UE Context Release Command message to let the base station trigger the UE to start a TAU request. Then the network node can re-establish an SGs association once a TAU is received from the UE, thereby restore SMS services.

An advantage of example embodiments herein is that they provide a network node triggered such as MME triggered TAU procedure for quick synchronization between a network and UEs such as IoT devices. This may be for some IoT related configuration, such as e.g. active timer for a Power Saving Mode (PSM) device, extended Discontinuous Reception (eDRX) cycle, Paging Time window for eDRX. This prevents a network node such as an MME the need to wait for a UE initiated TAU procedure, which may need quite longtime delay.

Figure 2:
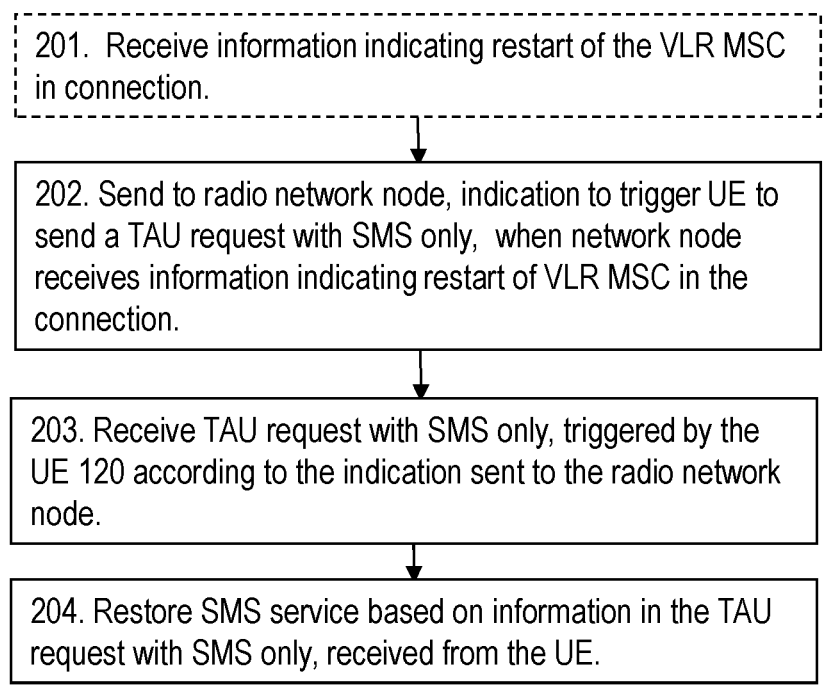
FIG. 2 is a flowchart depicting embodiments of a method in a network node.

Embodiments herein relate to wireless communication networks in general. FIG. 2 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. one or more UEs 120 also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises a radio network node 110 providing radio coverage in one or more cells, such as a cell 11, which may also be referred to as a beam or a beam group of beams. The radio network node 110 may be a NG-RAN node, transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with the UE 120 with Downlink (DL) transmissions to the UE 120 and Uplink (UL) transmissions from the UE 120.

A number of network nodes operate in the CN such as a EPC. E.g. the network node 130 which may be an MME, also referred to as MME 130. An MME is a main signaling node in the EPC. It is responsible for initiating paging and authentication of a UE. It also keeps location information at the Tracking Area level for each UE and is involved in choosing the right gateway during the initial registration process. MME connects to radio network nodes through the S1-MME interface and connects to gateways such as the Serving Gateway (SGW) 150 through the S11 interface. Multiple MMEs may be grouped together in a pool to meet increasing signaling load in the network.

A further network node operating in the CN is an MSC VLR 140. The MSC VLR 140 is an MSC that is associated to a VLR. The MSC and the VLR in the MSC VLR 140 are often co-existing, but not always. An MSC is responsible for routing data packets in a wireless communications network. A VLR is a database in a wireless communications network associated to an MSC. The VLR associated with the MSC will have subscriber's data stored in it.

A further network node operating in the CN may be the SGW 150. A function of an SGW is routing and forwarding of user data packets related to the UE 120 to and from a network such as the communications network 102, which e.g. may be the internet or a local area network or any network.

Figure 1:
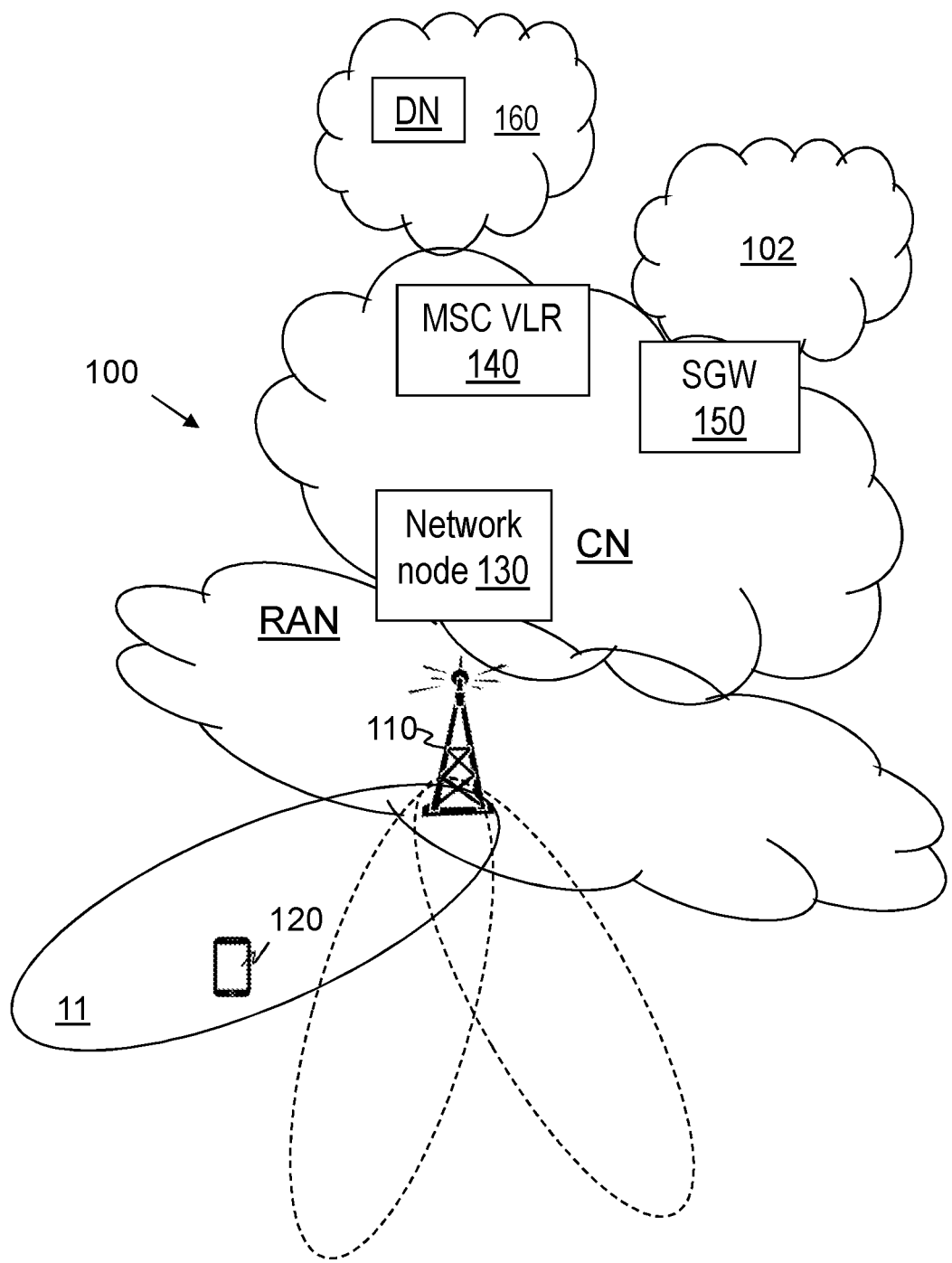
FIG. 1 is a schematic block diagram illustrating embodiments of a wireless communications network.

Methods herein may be performed by the network node 130. As an alternative, a Distributed Node (DN) and functionality, e.g. comprised in a cloud 160 as shown in FIG. 1, may be used for performing or partly performing the methods herein.

The above described problem is addressed in a number of embodiments, some of which may be seen as alternatives, while some may be used in combination.

FIG. 2 shows example embodiments of a method performed by the network node 130 for restoring an SMS service in a connection between the UE 120 and the communications network 102, and will now be described with reference to a flowchart depicted in FIG. 2.

In an example scenario in the connection used for an ongoing SMS service, the UE 120 is attached to the communications network 102 with EPS attach and SMS only, via the radio network node 110, the VLR MSC 140 and the network node 130.

As mentioned above, the network node 130 may be an MME and the UE 120 may be an IoT device.

The method comprises the following actions, which actions may be taken in any suitable order.

Action 201

The network node 130 receives information that indicates a restart of the VLR MSC 140 in the connection. This may e.g. be a VLR failure. A restart of the VLR MSC 140 means that both the MSC and the VLR in the VLR MSC 140 is restarted, or only the MSC but not the VLR in the VLR MSC 140 is restarted, or not the MSC but the VLR in the VLR MSC 140 is restarted.

This means that the ongoing SMS service needs to be restored, since the communication between the VLR MSC 140 and the network node 130 MME is based on the related SGs association, so once the MSC VLR 140 restart happens, then it will lose all related context for this UE 120, which means that the MSC VLR 140 is no longer able to handle any further SMS service for the UE 120 at all.

Action 202

When the network node 130 receives the information indicating a restart of the VLR MSC 140 in the connection, it sends an indication to the radio network node 110. This indication is to trigger the UE 120 to send a TAU request with SMS only. The TAU request with SMS only will e.g. be triggered to be sent from the UE 120 to the network node 130. This is performed to be able to restore the ongoing SMS service for the reason of the restart of the VLR MSC 140 in the connection.

The sending of the indication to the radio network node 110, to trigger the UE 120 to send a TAU request with SMS only, may be performed by sending the indication in a UE Context Release Command message to the radio network node 110.

According to some example embodiments herein, a new cause code in a UE Context Release Command is introduced to trigger the UE to perform TAU with SMS only. Thus, the indication in the UE Context Release Command message to the radio network node 110 may be represented by a cause code.

Action 203

The network node 130 receives the TAU request with SMS only, triggered by the UE 120 according to the indication sent to the radio network node 110.

Action 204

The network node 130 then restores the SMS service based on information in the TAU request with SMS only, received from the UE 120. If the association has to be established due to "VLR-Reliable" Mobility Management (MM) context variable is "false" or if the mapped LA from TA, included in the TAU request sent from UE, is changed, the new MME will send a Location Update Request to the MSC/VLR.

The restoring of the SMS service may be performed by re-establishing SGs association to the VLR MSC 140 based on the TAU request with SMS only, received from the UE 120. This is since once TAU is received; the network node 130 MME can re-establish the SGs association as the "VLR-Reliable" Mobility Management (MM) context variable to "false".

Figure 3:
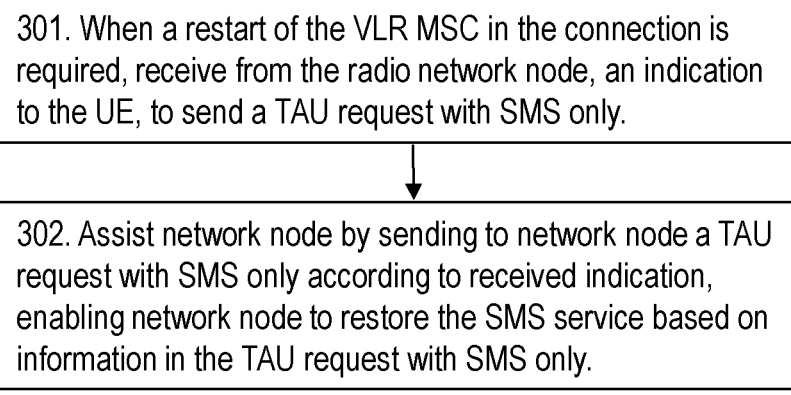
FIG. 3 is a flowchart depicting embodiments of a method in a UE.

FIG. 3 shows example embodiments of a method performed by the UE 120 for assisting the network node 130 in restoring a SMS service in a connection between the UE 120 and the communications network 100, and will now be described with reference to the flowchart depicted in FIG. 3. In the example scenario as also mentioned above, in the connection used for the ongoing SMS service, the UE 120 is attached to the communications network 102 with EPS attach and SMS only, via the radio network node 110, the VLR MSC 140 and the network node 130.

As mentioned above, the network node 130 may be an MME and the UE 120 may be an IoT device.

The method comprises the following actions, which actions may be taken in any suitable order.

Action 301

When a restart of the VLR MSC 140 in the connection is required, the UE 120 receives an indication from the radio network node 110. The indication indicates to the UE 120, to send a TAU request with SMS only. The network node 130 has sent the indication to the radio network node 110 and the radio network node 110 has then sent to the UE 120, the indication to send the TAU request with SMS only. This may e.g. be sent in an RRCConnectionRelease with a new cause code, which is to let the radio network node 110 notify UE 120 to do a TAU.

Action 302

The UE 120 then assists the network node 130 by sending to the network node 130, a TAU request with SMS only according to the received indication. This enables the network node 130 to restore the SMS service based on information in the TAU request with SMS only. This is performed as described above.

Figure 4:
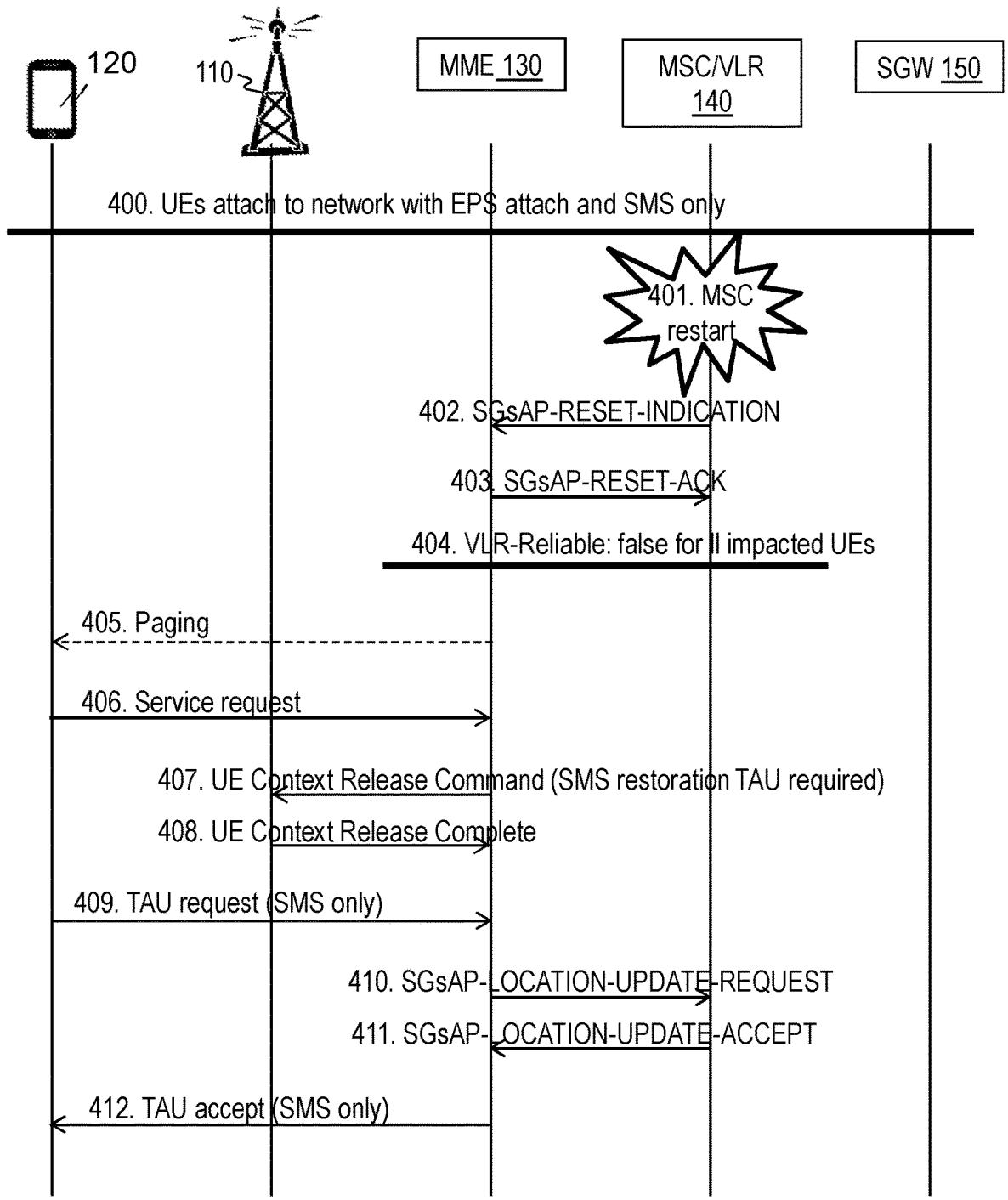
FIG. 4 is a sequence diagram depicting embodiments of a method in a wireless communications network.

FIG. 4 is a sequence diagram depicting an example of MME triggered TAU for SMS over SGs restoration. In this example the network node is represented by an MME and is referred to as the MME 130.

400. The UE 120 attaches to the communications network 102 with EPS attach and only.

401. By some reason, a restart of the MSC VLR 140 occurs.

402. The MME 140 is informed about the restart of the MSC VLR 140, e.g. in a SGsAP-RESET-INDICATION message from the MSC VLR 140 to the MME 130. The restart of the MSC VLR 140 means that SGsAP need to be reset and the SMS service need to be restored since after such a restart, the MSC VLR 140 had lost all related SGs association with the MME 130, so there is no way to handle any services over SGs anymore. This action is related to Action 201 above.

403. The MME 130 replies to the MSC VLR 140 that the information is understood e.g. in a SGsAP-RESET-ACK message. The MME 130 will now take actions to reestablish the SGsAP and restore the SMS service.

404. The MME 130 marks VLR-Reliable in Mobility Management (MM) context to false for all impacted UE's including the UE 120, which is used for the MME 130 to decide whether to re-establish the SGs association, once any uplink signaling from the UE 120 is received later. An MM context e.g. comprises security related information as well as other parameters such as IMSI.

405. If the MSC VLR 140 supports restoration of data in VLR, and there is MT SMS coming, then MSC VLR 140 may send an SGsAP-PAGING-REQUEST message to the network node 110. This is to inform the MME 130 that there is MT SMS for the related UE 120, so the MME 130 will anyway try to page the UE 120 if it is ECM_IDLE. It should be noted that the MME 130 may also decide to trigger TAU, for all impacted UEs such as NB-IoT devices to restore SMS over SGs, one by one. If the UE 120 is idle, then MME 130 will send Paging first.

406. The UE 120 then sends a Service Request message to the MME 130. This is taken as a paging response by the UE 120, when it received Paging from the radio network node 110.

407. When the service request from the UE 120 is received by the MME 130, the MME 130 sends a UE Context Release Command message to the radio network node 110 comprising an indication to trigger the UE 120 to send a TAU request with SMS only.

Upon receiving this indication, the radio network node 110 may e.g. send a special cause code in RRCConnectionRelease message to the UE 120 which is to notify UE 120 to do a TAU.

The indication may be represented by the special cause code e.g. referred to as SMS restoration TAU required, e.g. in a RRCConnectionRelease message. As an alternative, the cause code may be adjusted and/or extended as configuration update TAU required" for future usage, since "VLR reliable" is "false" in the MME 130. This action is related to Action 202 above.

408. The radio network node 110 responds with a UE Context Release Complete message to the MME 130. This is performed upon reception of the UE CONTEXT RELEASE COMMAND message, the radio network node 110 shall release all related signalling and user data transport resources and reply with the UE CONTEXT RELEASE COMPLETE message.

409. Based on the RRCConnectionRelease with a specified cause code from the radio network node 110, the UE 120 is triggered to send to the MME 130 a TAU request with SMS only message. This action is related to Action 203 above.

410. The MME 130 then restores the SMS service based on information in the TAU request with SMS only, received from the UE 120 by sending a SGsAP-LOCATION-UPDATE-REQUEST message to the MSC VLR 140 to reestablish SGs association. Reestablish SGs association is performed by the Location Update procedure from the MME 130 to MSC VLR 140 is to re-establish the SGs association. This action is related to Action 204 above.

411. The MME 130 receives a SGsAP-LOCATION-UPDATE-ACCEPT message from the MSC VLR 140 when the SGs association is reestablished. This means that the SMS service has been restored. This is since once SGs association is established, then SMS over SGs can be served.

412. When the SGs association is reestablished and the SGsAP-LOCATION-UPDATE-ACCEPT message has been received from the MSC VLR 140, the UE 120 is informed by sending a TAU Accept with SMS only message to the UE 120.

Now the SMS service has been restored and Mobile Originated (MO) i.e. originated from by UE 120, and Mobile Terminated (MT) i.e. terminated at the UE 120, SMS works well again.

In some legacy embodiments, the network node may release the UE context to the base station with a cause code e.g. referred to as "load balancing TAU required" to trigger the UE 120 to send a TAU request. The radio network node 110 would then select another network node such as another network node such as MME in a pool to serve the UE 120, while in this case, the network node 110 should trigger a release of the Radio Resource Control (RRC) resource for the UE 120. The UE would then send the TAU request successively. Then the new selected network node starts to establish a new SGs association for the UE. The new network node may e.g. be randomly selected, which means the same network node 130 such as MME 130 or another new network node such as new MME in the same pool may be selected. So with the new cause code also referred to as specified cause code, the only impact is on base station and the network node such as the MME, but it would not impact the UE side.

To perform the method actions above, the network node 130 is configured to restore an SMS service in a connection between a UE 120 and the communications network 102. The network node 130 may comprise an arrangement depicted in FIGS. 5a and 5b. As mentioned above, the UE 120 is adapted to be attached to the communications network 102 with EPS attach and SMS only, via a radio network node 110, the VLR 140 and the network node 130.

In some embodiments, any one or more out of: The network node 130 is adapted to be an MME, and the UE 120 is adapted to be an IoT device.

The network node 130 may comprise an input and output interface 500 configured to communicate with network nodes such as the network node 110 and the UE 120. The input and output interface may comprise a wireless receiver (not shown) and a wireless transmitter (not shown).

The network node 130 may further be configured to, e.g. by means of a receiving unit 510 in the network node 130, receive information indicating a restart of the VLR MSC 140 in the connection.

The network node 130 may further be configured to, e.g. by means of the receiving unit 510 in the network node 130, receive the TAU request with SMS only, adapted to be triggered by the UE 120 according to the indication sent to the radio network node 110.

The network node 130 may further be configured to, e.g. by means of a sending unit 520 in the network node 130, when receiving information indicating a restart of the VLR MSC 140 in the connection, send to the radio network node 110, an indication to trigger the UE 120 to send a TAU request with SMS only.

In some embodiments, the network node 130 is further configured to e.g. by means of a sending unit 520 in the network node 130, send to the radio network node 110, the indication to trigger the UE 120 to send a TAU request with SMS only, by sending the indication in a UE Context Release Command message to the radio network node 110.

In some embodiments, the indication in the UE Context Release Command message to the radio network node 110 is adapted to be represented by a cause code.

The network node 130 may further be configured to, e.g. by means of a restoring unit 530 in the network node 130, restore the SMS service based on information in the TAU request with SMS only, adapted to be received from the UE 120.

In some embodiments, the network node 130 is further configured to, e.g. by means of the restoring unit 530 in the network node 130, restore the SMS service by re-establishing SGs association to the VLR MSC 140 based on the TAU request with SMS only, adapted to be received from the UE 120.

Figure 5A:
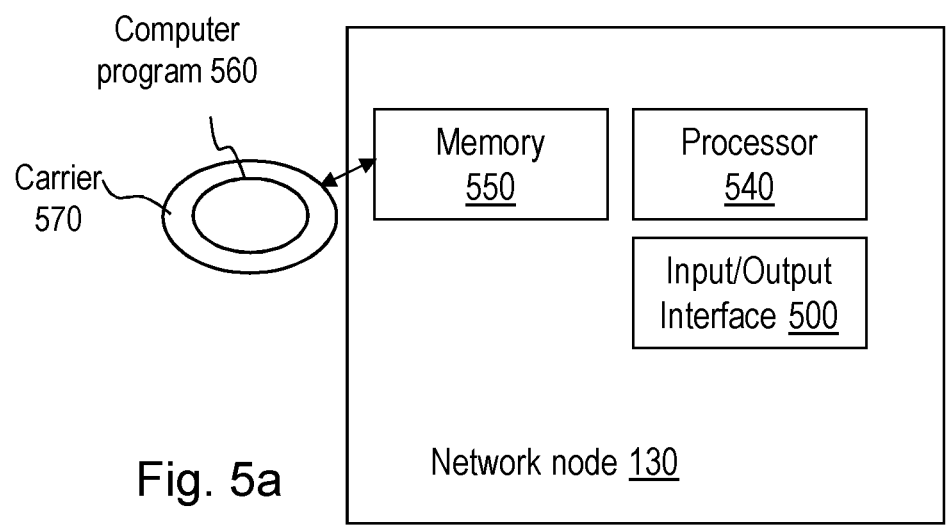
FIG. 5 is a schematic block diagram illustrating embodiments of a radio network node.
Figure 5B:
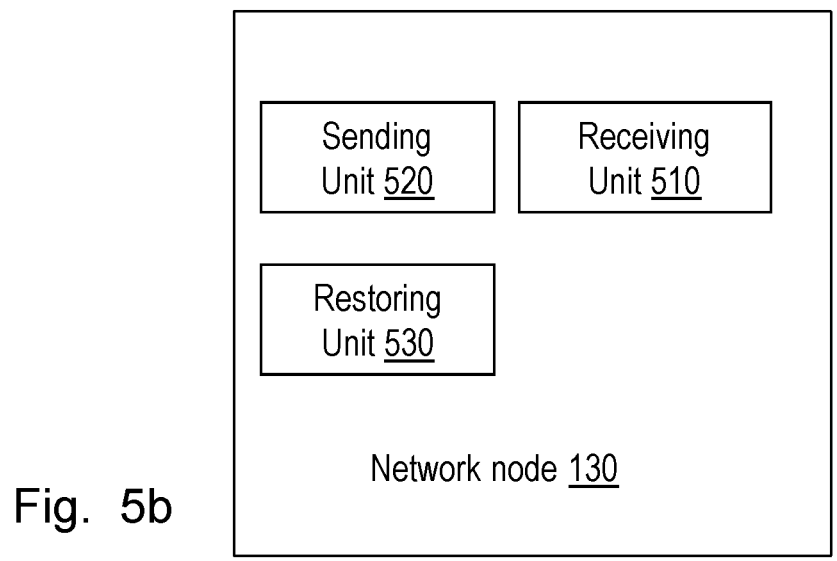

The embodiments herein may be implemented through a processor or one or more processors, such as the processor 540 of a processing circuitry in the the network node 130 depicted in FIG. 5a, together with respective computer program code for performing the functions and actions of the embodiments herein. The program code mentioned above may also be provided as a computer program product, for instance in the form of a data carrier carrying computer program code for performing the embodiments herein when being loaded into the network node 130. One such carrier may be in the form of a CD ROM disc. It is however feasible with other data carriers such as a memory stick. The computer program code may furthermore be provided as pure program code on a server and downloaded to the network node 130.

The network node 130 may further comprise a memory 550 comprising one or more memory units. The memory 550 comprises instructions executable by the processor in network node 130. The memory 550 is arranged to be used to store e.g. information, indications, cause codes, data, configurations, and applications to perform the methods herein when being executed in the network node 130.

In some embodiments, a computer program 560 comprises instructions, which when executed by the respective at least one processor 540, cause the at least one processor 540 of the network node 130 to perform the actions above.

In some embodiments, a carrier 570 comprises the respective computer program 560, wherein the carrier is one of an electronic signal, an optical signal, an electromagnetic signal, a magnetic signal, an electric signal, a radio signal, a microwave signal, or a computer-readable storage medium.

Those skilled in the art will appreciate that the units in the network node 130 described above may refer to a combination of analog and digital circuits, and/or one or more processors configured with software and/or firmware, e.g. stored in the network node 130, that when executed by the respective one or more processors such as the processor described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the method actions above, the UE 120 is configured to assist the network node 130 in restoring an SMS service in a connection between the UE 120 and the communications network 102. The UE 120 may comprise an arrangement depicted in FIGS. 6a and 6b. As mentioned above, the UE 120 is adapted to be attached to the communications network 102 with EPS attach and SMS only, via the radio network node 110, a VLR MSC 140 and the network node 130.

In some embodiments, any one or more out of: The network node 130 is adapted to be a MME, and the UE 120 is adapted to be an IoT device.

The UE 120 may comprise an input and output interface 600 configured to communicate with network nodes such as the network node 110 and the network node 130. The input and output interface may comprise a wireless receiver (not shown) and a wireless transmitter (not shown).

The UE 120 is configured to, e.g. by means of a receiving unit 610 in the UE 120, when a restart of the VLR MSC 140 in the connection is required, receive from the radio network node 110, an indication to the UE 120, to send a TAU request with SMS only.

The UE 120 is further configured to, e.g. by means of a assisting unit 620 in the UE 120, assist the network node 130 by sending to the network node 130 a TAU request with SMS only according to the received indication, enabling the network node 130 to restore the SMS service based on information in the TAU request with SMS only.

Figure 6A:
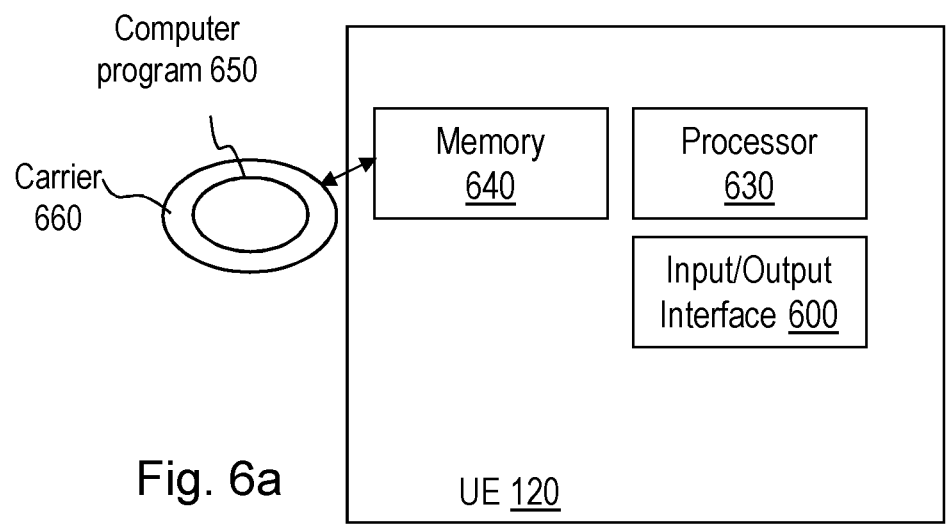
FIG. 6 is a schematic block diagram illustrating embodiments of a UE.
Figure 6B:
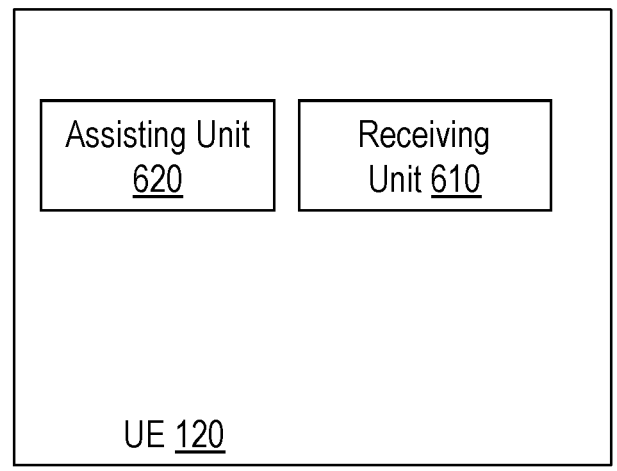

The embodiments herein may be implemented through a respective processor or one or more processors, such as the processor 630 of a processing circuitry in the UE 120 depicted in FIG. 6a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 640 comprising one or more memory units. The memory 1050 comprises instructions executable by the processor in UE 120. The memory 640 is arranged to be used to store e.g. information, indications, cause codes, data, configurations, and applications to perform the methods herein when being executed in the UE 120.

In some embodiments, a computer program 650 comprises instructions, which when executed by the respective at least one processor 630, cause the at least one processor of the UE 120 to perform the actions above.

In some embodiments, a respective carrier 660 comprises the respective computer program 650, wherein the carrier 660 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
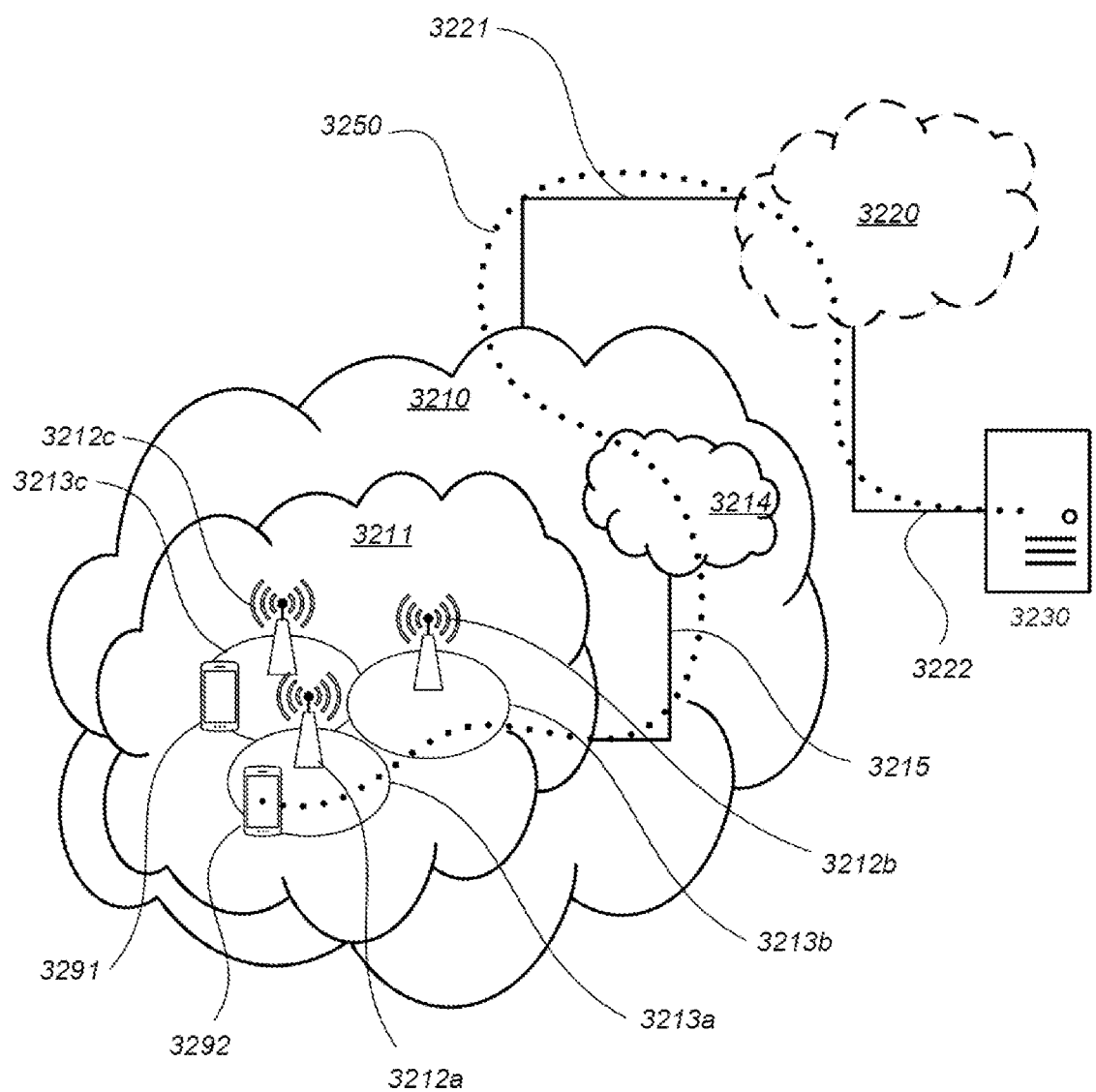
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212*a*, 3212*b*, 3212*c* and one of the UEs 3291, 3292 of FIG. 7, respectively. This is to say, the inner workings of these entities may be as shown in FIG. 8 and independently, the surrounding network topology may be that of FIG. 7.

Figure 8:
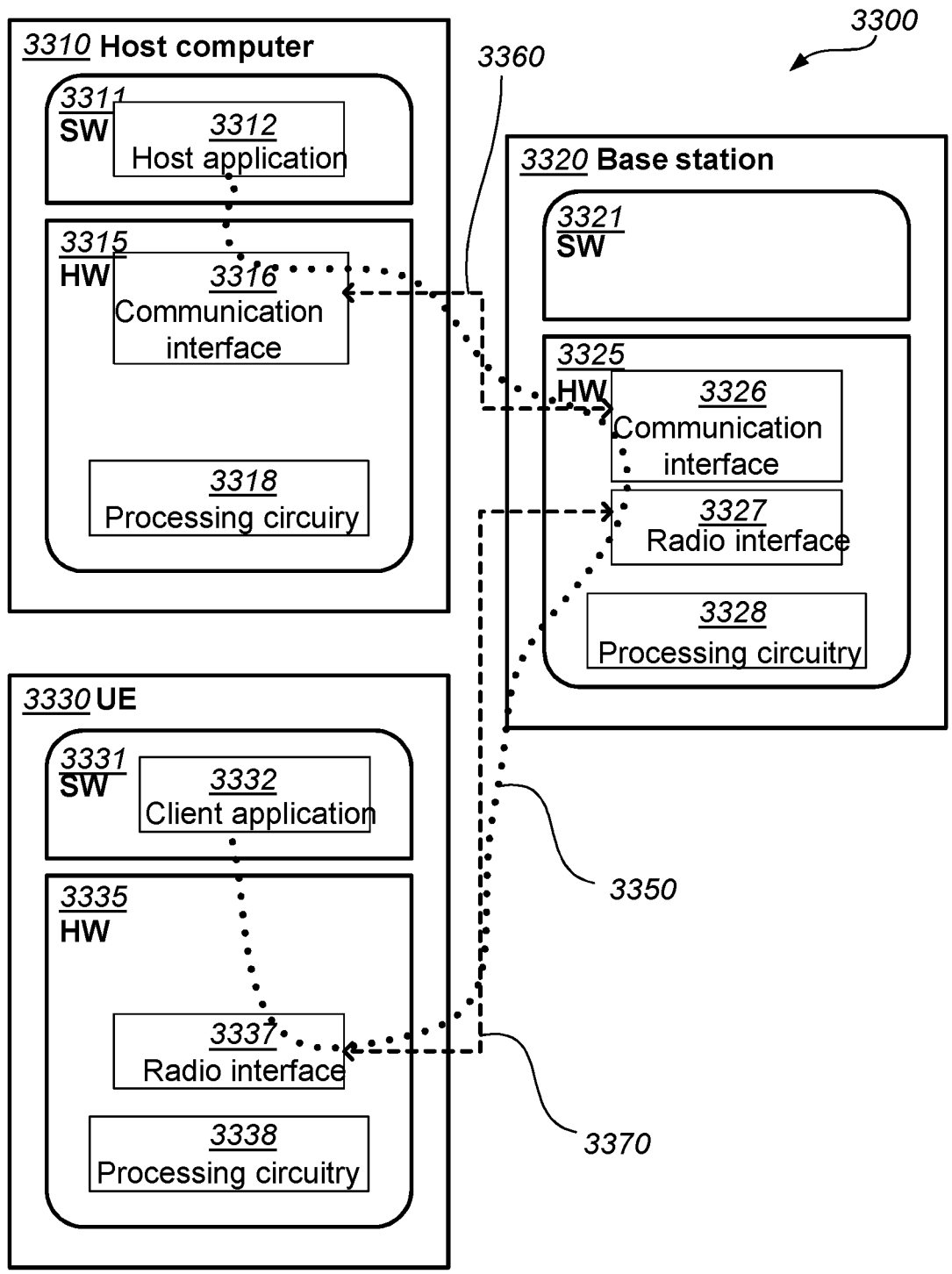
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 9:
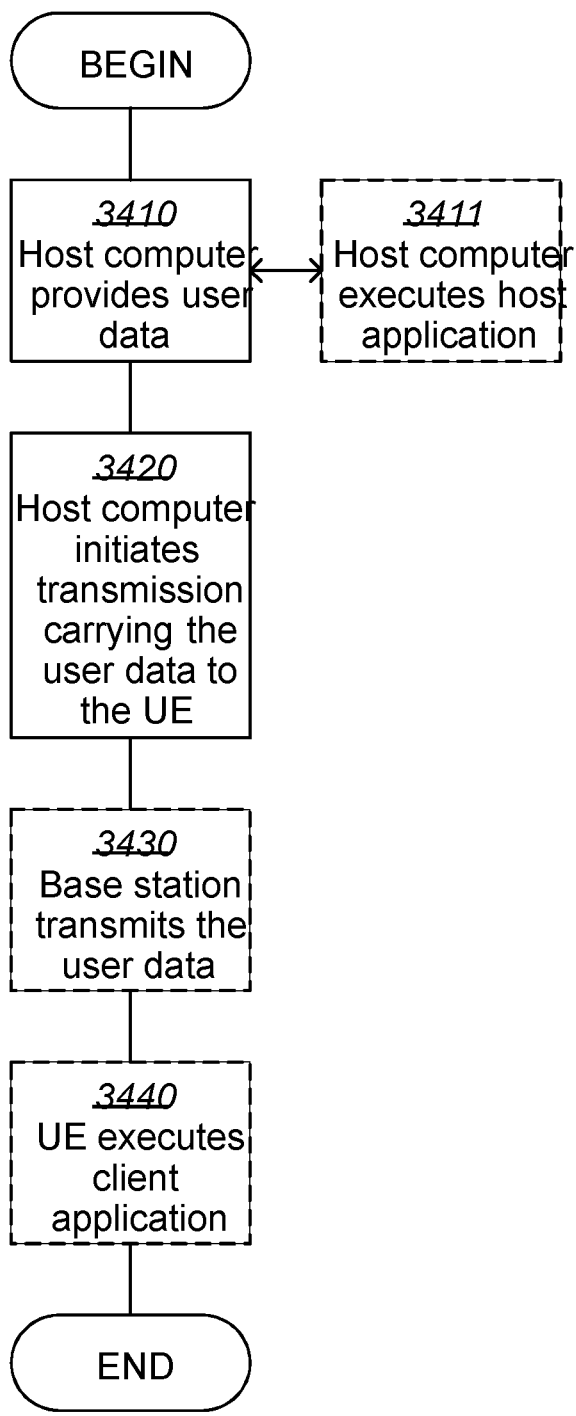
FIGS. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 10:
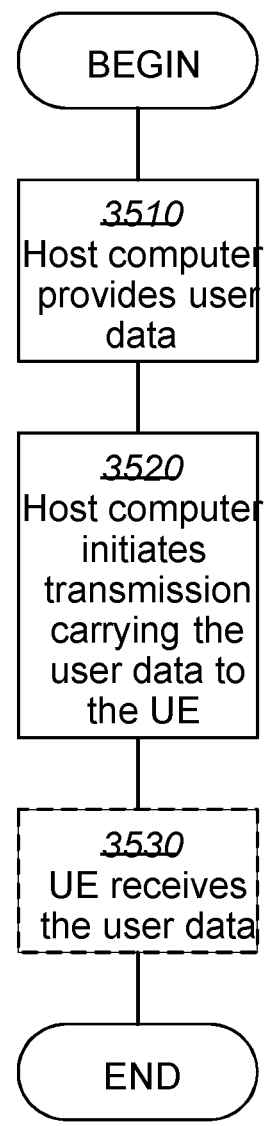

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
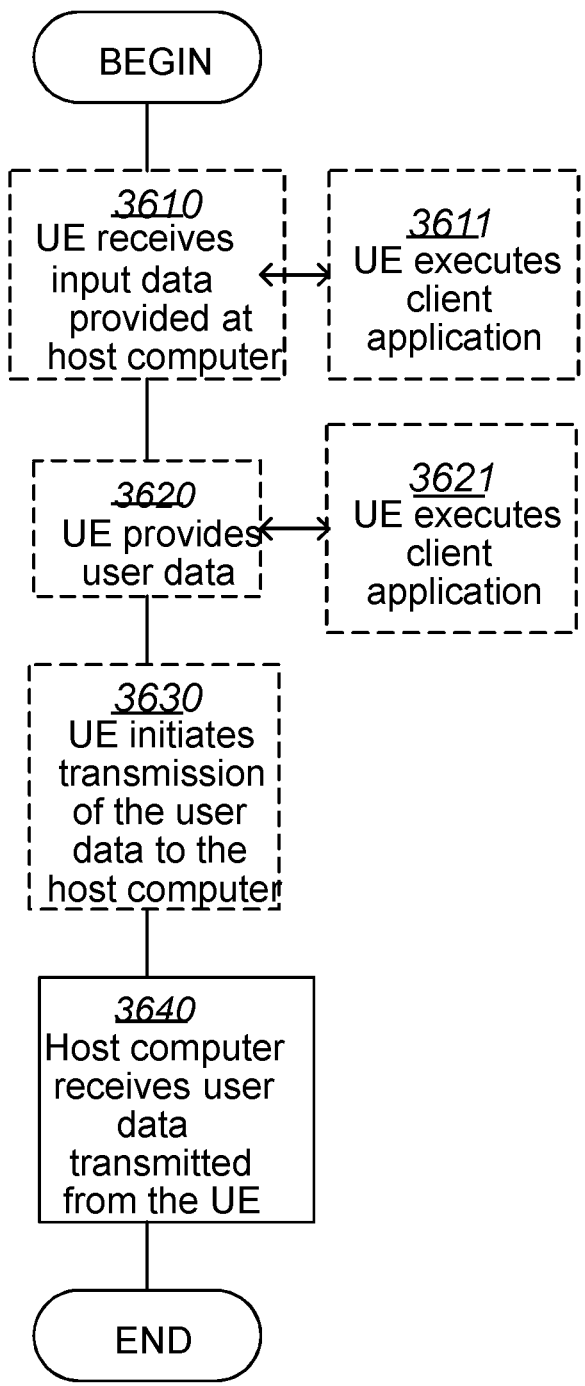

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
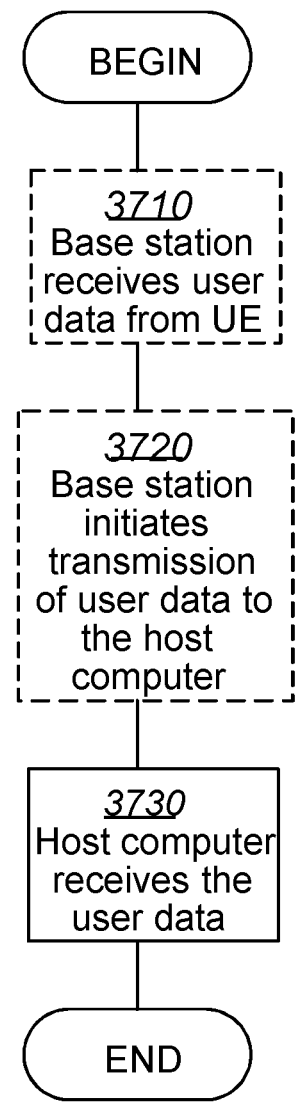

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for restoring a Short Message Service, SMS, service in a connection between a User Equipment, UE, and a communications network, which UE is attached to the communications network with Evolved Packet System, EPS, attach and SMS only, via a radio network node, a Visitor Location Register, VLR, Mobile Switching Centre, MSC, and the network node, the method comprising:
   when receiving information indicating a restart of the VLR MSC in the connection, sending to the radio network node, an indication to trigger the UE to send a Tracking Area Update, TAU, request with SMS only,
   receiving the TAU request with SMS only, triggered by the UE according to the indication sent to the radio network node, and
   restoring the SMS service based on information in the TAU request with SMS only, received from the UE.

2. The method according to claim 1, wherein the indication in the UE Context Release Command message to the radio network node is represented by a cause code.

3. The method according to claim 1, wherein the sending to the radio network node, of the indication to trigger the UE to send a TAU request with SMS only, is performed by sending the indication in a UE Context Release Command message to the radio network node.

4. The method according to claim 1, wherein the restoring of the SMS service is performed by re-establishing serving gateways (SGs) association to the VLR MSC based on the TAU request with SMS only, received from the UE.

5. The method according to claim 1, wherein any one or more out of:
   the network node is a Mobility Management Entity, MME, and
   the UE is an Internet of Things, IoT, device.

6. A non-transitory computer-readable medium comprising instructions, which when executed by a processor, causes the processor to perform actions according to claim 1.

7. A method performed by a User Equipment, UE, for assisting a network node in restoring a Short Message Service, SMS, service in a connection between the UE and a communications network, wherein the UE is attached to the communications network with Evolved Packet System, EPS, attach and SMS only, via a radio network node, a Visitor Location Register, VLR, Mobile Switching Centre, MSC, and a network node, the method comprising:
   when a restart of the VLR MSC in the connection is required, receiving from the radio network node, an indication to the UE, to send a Tracking Area Update, TAU, request with SMS only, and assisting the network node by sending to the network node a TAU request with SMS only according to the received indication, enabling the network node to restore the SMS service based on information in the TAU request with SMS only.

8. The method according to claim 7, wherein any one or more out of:
the network node is a Mobility Management Entity, MME, and
the UE is an Internet of Things, IoT, device.

9. A non-transitory computer-readable medium comprising instructions, which when executed by a processor, causes the processor to perform actions according to claim 7.

10. A network node configured to restore a Short Message Service, SMS, service in a connection between a User Equipment, UE, and a communications network, which UE is adapted to be attached to the communications network with Evolved Packet System, EPS, attach and SMS only, via a radio network node, a Visitor Location Register, VLR, Mobile Switching Centre, MSC, and the network node, the network node being configured to:
when receiving information indicating a restart of the VLR MSC in the connection, send to the radio network node, an indication to trigger the UE to send a Tracking Area Update, TAU, request with SMS only,
receive the TAU request with SMS only, adapted to be triggered by the UE according to the indication sent to the radio network node, and
restore the SMS service based on information in the TAU request with SMS only, adapted to be received from the UE.

11. The network node according to claim 10, wherein the network node further is configured to send to the radio network node, the indication to trigger the UE to send a TAU request with SMS only, by sending the indication in a UE Context Release Command message to the radio network node.

12. The network node according to claim 11, wherein the indication in the UE Context Release Command message to the radio network node is adapted to be represented by a cause code.

13. The network node according to claim 10, wherein the network node further is configured to restore the SMS service by re-establishing SGs association to the VLR MSC based on the TAU request with SMS only, adapted to be received from the UE.

14. The network node according to claim 10, wherein any one or more out of:
the network node is adapted to be a Mobility Management Entity, MME, and
the UE is adapted to be an Internet of Things, IoT, device.

15. A User Equipment, UE, configured to assist a network node in restoring a Short Message Service, SMS, service in a connection between the UE and a communications network, wherein the UE is adapted to be attached to the communications network with Evolved Packet System, EPS, attach and SMS only, via a radio network node, a Visitor Location Register, VLR, Mobile Switching Centre, MSC, and a network node, the UE being configured to:
when a restart of the VLR MSC in the connection is required, receive from the radio network node, an indication to the UE, to send a Tracking Area Update, TAU, request with SMS only, and
assist the network node by sending to the network node a TAU request with SMS only according to the received indication, enabling the network node to restore the SMS service based on information in the TAU request with SMS only.

16. The UE according to claim 15, wherein any one or more out of:
the network node is adapted to be a Mobility Management Entity, MME, and
the UE is adapted to be an Internet of Things, IoT, device.

* * * * *